Dec. 10, 1963     F. G. PRESNELL     3,113,581
FLOW PROPORTIONER

Original Filed July 17, 1958     4 Sheets-Sheet 1

INVENTOR.
FRANK G. PRESNELL
BY Forrest J. Lilly
ATTORNEY

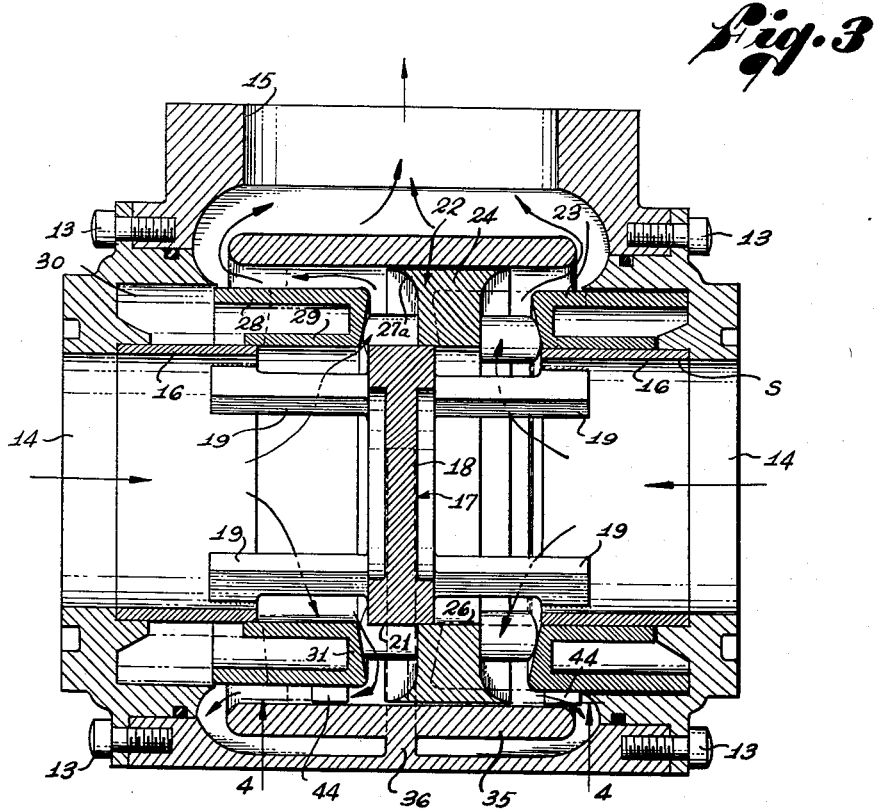

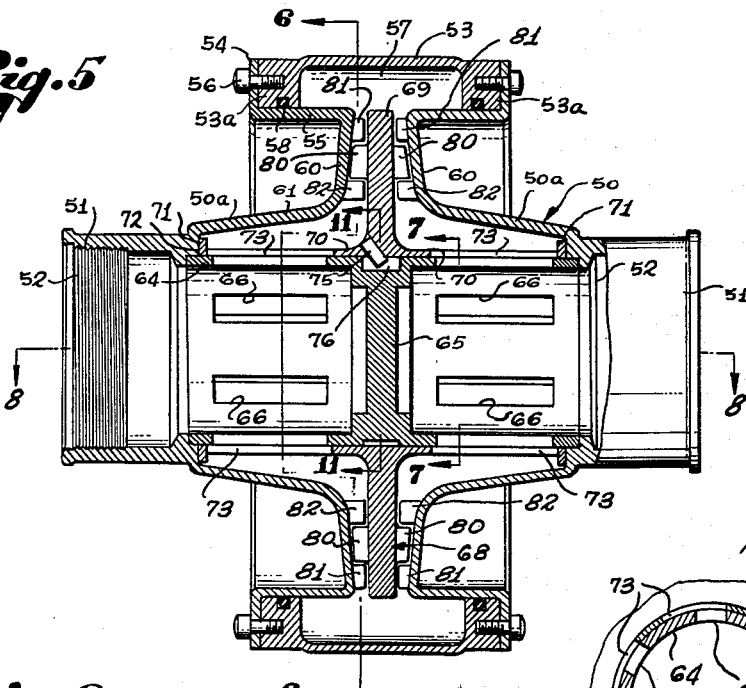
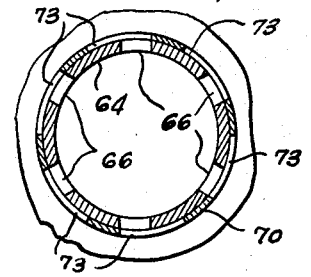
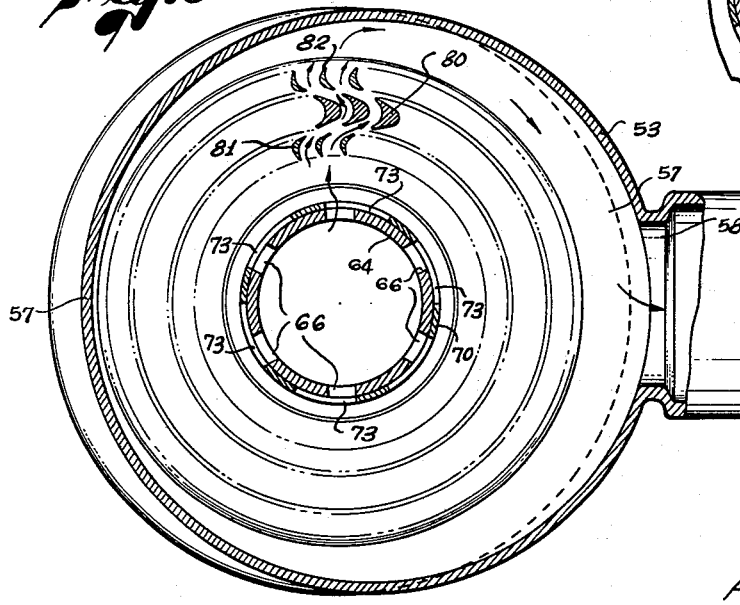

Dec. 10, 1963  F. G. PRESNELL  3,113,581
FLOW PROPORTIONER
Original Filed July 17, 1958  4 Sheets-Sheet 4
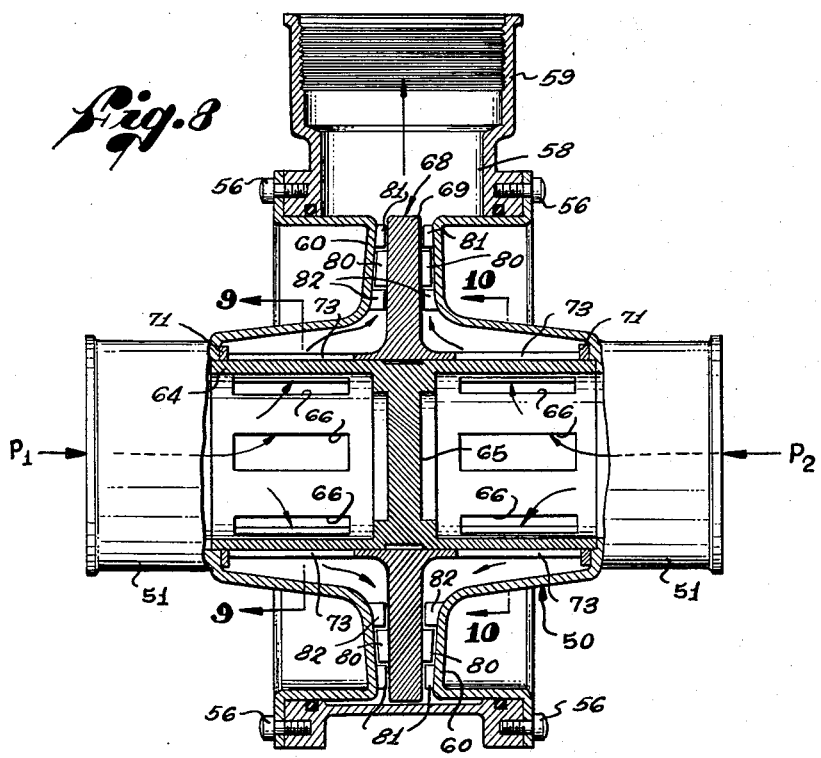
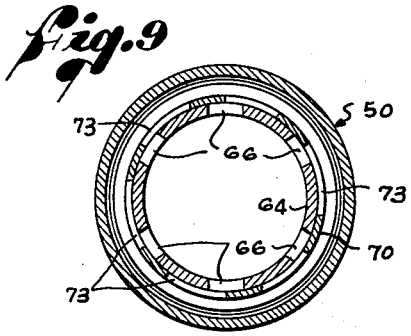
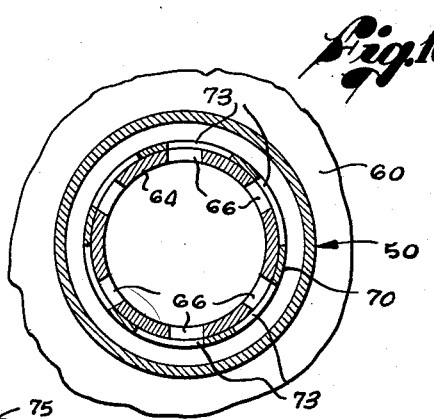
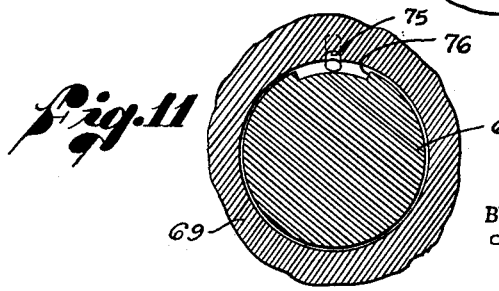
INVENTOR.
FRANK G. PRESNELL
BY Forrest J. Lilly
ATTORNEY United States Patent Office 3,113,581
Patented Dec. 10, 1963

3,113,581
FLOW PROPORTIONER
Frank G. Presnell, 2818 Laurel Canyon Place,
Los Angeles 46, Calif.
Continuation of abandoned application Ser. No. 749,129, July 17, 1958. This application June 14, 1961, Ser. No. 117,187
7 Claims. (Cl. 137—101)

This invention relates generally to devices for dividing a single inflow of fluid into two outflows of equal or predeterminedly unequal volume, and/or for combining into a single outflow two inflows maintained either equal or predeterminedly unequal in volume. Such devices, for equal flows, are known as flow equalizers, and when the flows are unequal but in predetermined proportion, are, strictly speaking, more accurately referred to as flow proportioners. For convenience, and since equal flow devices are the more common, the invention will hereinafter be referred to primarily as a flow equalizer, though without limitation thereto.

This application is a continuation of my prior application, Serial No. 749,129, filed July 17, 1958, now abandoned, for Flow Proportioner.

Two general types of flow equalizers are known, the throttling type, and the pump-motor type.

In the throttling type equalizer, as heretofore known, the fluid, before its combination, or after its division, is passed through orifices. The pressure drop across these orifices creates, upon deviation of the flows from the designed proportions, a pressure difference on the two faces of a piston, which thereupon shifts to throttle the flow which exceeds the designed proportion. The disadvantage of the throttling type equalizer of this type are that its accuracy at low flows has generally been poor; that if it is to both combine and divide flows, it must incorporate four check valves to give different flow paths for division and combination; that its functioning requires a pressure drop across orifices, and that this pressure drop represents energy loss seriously objectionable in some low-pressure systems, such as aircraft fuel systems; that the flow paths comprise a series of chambers and passages of different areas which cause a further and frequently greater pressure drop due to the acceleration and decelerations of the fluid; and that it tends to be objectionably bulky when designed for large flows.

The pump-motor type of equalizer generally comprises a pair of mechanically interconnected gear or vane devices capable of functioning as either pumps or motors. Because of leakage and friction, this type tends to be unsuitable for low flows and high pressures. It has been more successful in low-pressure, high-flow applications, as in fuel systems. But even in such applications, it tends to be complicated and bulky, and involves wear-subject bearings, sliding vanes, and the like, all of which are objectionable. A supposed advantage of the pump-motor type of equalizer is a theoretical capability of equalizing flows without loss of energy. However, and without going into detail in this regard, energy is dissipated continuously in overcoming friction, and it is probable that in most aircraft fuel systems and the like, the pump-motor equalizer involves an energy loss even greater than that which would be caused by a throttling-type equalizer.

Objects of the present invention are as follows:

To provide a throttling-type flow equalizer of a novel type capable of both combining and dividing flow without requiring the use of a plurality of check valves.

To provide a flow equalizer of improved compactness.

To provide a flow equalizer with a low pressure drop.

To provide a flow equalizer particularly adapted to handling large flows with low pressure drop in a device of small size.

To provide a flow equalizer embodying means of minimizing sticking of the moving parts.

To provide a flow equalizer of simple and inexpensive construction.

The throttling-type flow equalizer of the present invention acts in response to dynamic action of the fluid flow rather than in response to pressure drop across orifices. This dynamic action urges the throttling means to a flow-equalizing position, whether the flow is in the combining or the dividing direction. The equalizer of the invention is further characterized in that the fluid, in combining, flows in a reverse direction via the same path it follows in dividing, thereby obviating the need for flow-path-changing check valves or their equivalents. Other features of the invention will appear hereinafter.

Reference is now directed to the accompanying drawings showing two present illustrative embodiments of the invention, and wherein:

FIG. 3 is a section taken on line 3—3 of FIG. 1;

FIG. 4 is a detail taken in accordance with line 4—4 of FIG. 3;

FIG. 5 is a longitudinal sectional view through another embodiment of equalizer in accordance with the invention;

FIG. 6 is a section taken on broken line 6—6 of FIG. 5;

FIG. 7 is a section taken on line 7—7 of FIG. 5;

FIG. 8 is a view taken on line 8—8 of FIG. 5;

FIG. 9 is a section taken on line 9—9 of FIG. 8, being similar to a portion of FIG. 6 but showing another position of the throttling means;

FIG. 10 is a section taken on line 10—10 of FIG. 8 being similar to a portion of FIG. 7, but showing another position of the throttling machine means; and FIG. 11 is a section taken in accordance with line 11—11 of FIG. 5.

Figure 1:
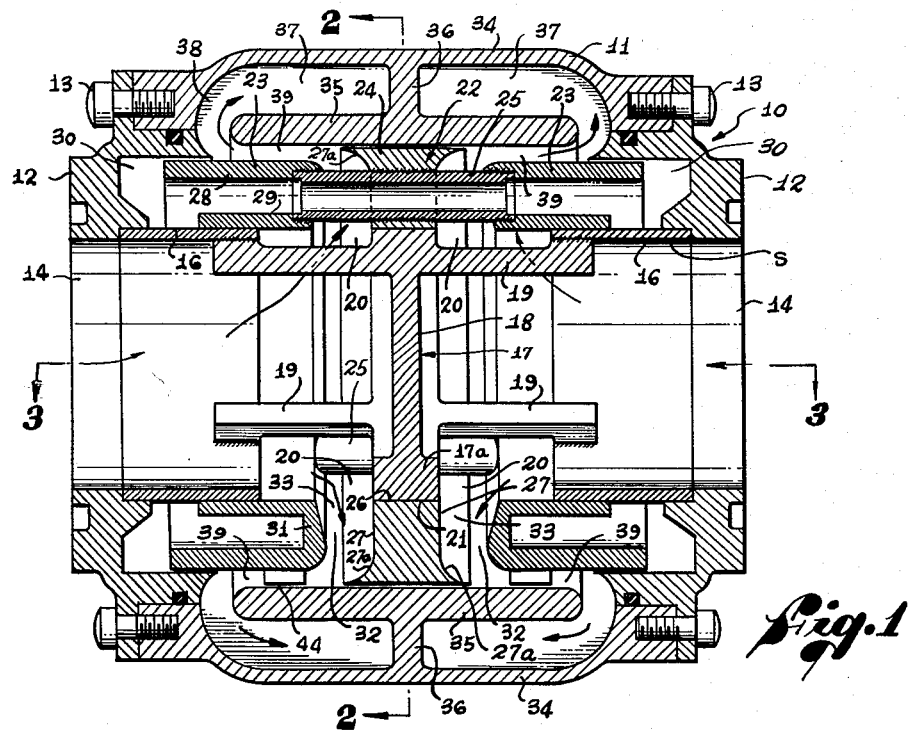
FIG. 1 is a longitudinal sectional view through one illustrative form of equalizer in accordance with the invention.
Figure 2:
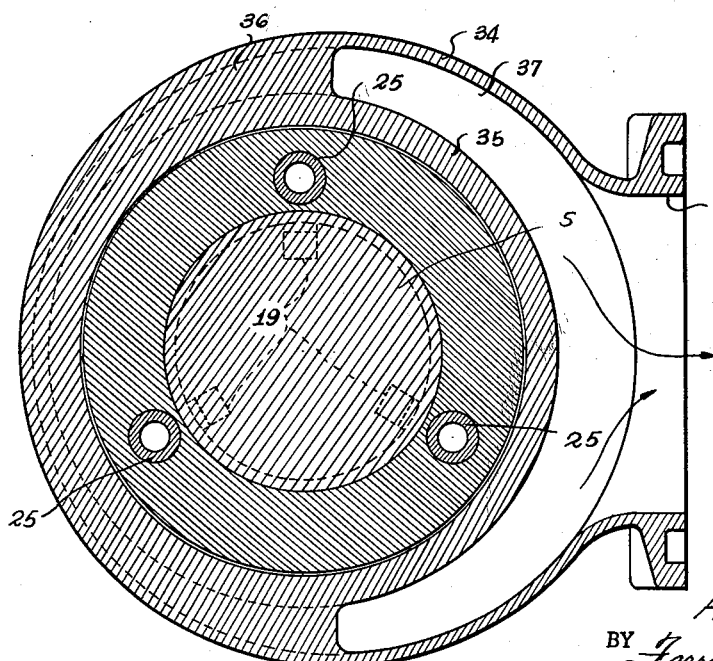
FIG. 2 is a transverse section taken on line 2—2 of FIG. 1.

In FIGS. 1 to 4 of the drawings, showing one illustrative embodiment of the invention, numeral 10 designates generally a housing made up of a generally cylindric body 11 and end caps 12 secured thereto as by screws 13. End caps 12 are formed with end ports 14, and body 11 is formed with a mid-port 15 (FIG. 2).

A sleeve assembly S comprises a pair of end sleeves 16 pressed into end caps 12 and extending inwardly for a distance toward the longitudinal mid-point of the equalizer, and an intermediate member 17 comprised of a central transverse wall or diaphragm 18 and a plurality of struts 19 joined to sleeves 16. Diaphragm 18 will be seen to prevent flow between the end ports; and the assembly as described affords a radial port 20 between the diaphragm 18 and each of end sleeves 16. The intermediate component 17 of sleeve assembly 15 has a rim 17a forming an exterior cylindric land 21; and surrounding and longitudinally slidable on this land 21 and on sleeves 16 is a slide generally designated by numeral 22. This slide comprises two annular end members 23 and an intermediate member 24, of somewhat larger outside diameter than end members 23, connected by a plurality of tubular struts 25. Intermediate member 24 is in the form of an annulus, having an inside cylindric bearing surface 26 slidable on the aforementioned land 21, and of the same width. The side faces 27 of annulus 24, adjacent to bearing surface 26, are coplanar with the side faces of rim 17a when the slide is centralized (FIG. 1), and the outer portions of the faces 27 are concavely curved, as at 27a, so as to face longitudinally outward and radially inward, for a purpose that will appear.

Each end member 23 of slide 22 comprises a pair of radially spaced cylindrical outer and inner walls 28 and 29, respectively, of which the outer wall 28 fits with some clearance the outside defining wall of a cylindrical recess 30 in the corresponding end cap 12, and the inner wall 29 has a close sliding fit on a corresponding end sleeve 16. Webs 31 join the inner ends of the pairs of walls 28 and 29, and, together with the side faces 27 of slide annulus 24, form annular, generally radial passages 32 through the slide. These passages form throttling ports 33 which open through the inside of the slide, and which are opposed to the aforementioned sleeve ports 20. Longitudinal movement of the slide is limited by bottoming of annular wall members 28 in the recesses 30 in end caps 12 (FIG. 3). The aforementioned tubular struts 25 extend through the webs 31, thus establishing fluid communication between the end cap recesses 30 to assure equalization of static pressures therein.

The generally cylindrical body member 11 comprises an outer annular wall 34, to whose convergent end portions 34a the end caps 12 are joined, and an inner wall 35 eccentrically positioned and spaced within outer wall 34, the two walls being joined by a rib 36 in the transverse mid-plane of FIG. 2, this rib extending half-way around said walls, on the side remote from mid-port 15. The inside surface of wall 35 is fitted, with some clearance, by the outside of the intermediate member 24 of slide 22.

The eccentrically disposed walls 34 and 35 form two circumferential passages 37, one on each side of rib 36, which communicate with mid-port 15, and which are of maximum width opposite mid-port 15, reducing gradually to minimum width at a point diametrically opposite the mid-port. The mid-port 15 has an area equal to the combined area of the two passages 37 at the junction therewith. Each passage 37, therefore, is half the area of the mid-port where it joins the mid-port. The two passages 37 are actually in open communication outside the two ends of the rib 36.

The body wall 35 terminates at its ends short of the ends of the wall 34, so as to form fluid passages 38 around the ends of the wall 35 between the spaces or passages 37 and annular spaces or passages 39 between the wall 35 and the outside walls 28 of slide 22. It will be seen that the annular spaces 39 are in communication with the ports 20 via annular passages 32 and throttling ports 33. It will also be seen that the spaces 39 are faced at one side by the curved surfaces 27a of the annulus 24 of slide member 22. The curved surfaces 27a are tangent to the inner surface of wall 35, and also to normal surfaces 27 on annulus 24, and function to change the direction of fluid flow between passages 32 and 39 from radially outward to longitudinally outward (or vice versa). The surface portions 27a on annulus 24 therefore act as means on which dynamic forces are exerted, causing longitudinal movements of the slide, as to be presently described in more particular.

The structure described provides a fluid passageway from each end port to the mid-port, the passageway being from the end port inward through the end sleeves 16, radially outward through ports 20, ports 33, and the spaces 32 between the slide annulus 24 and the webs 31 at the inner ends of the end portions 23 of the slide, thence longitudinally outward through the annular spaces 39 between the slide end portions 23 and the cylindrical body wall 35, radially outward at 38 between the ends of body wall 35 and the ends caps and the defining end wall surfaces of annular body passage 37, longitudinally inward into body passages 37, and circumferentially around this passage 37 to the mid-port. It will be seen that the direction of fluid flow assumed corresponds to the use of the equalizer as a flow combiner. The direction of fluid flow is reversed when the device is used as a flow divider. As shown in the drawings, most of the flow path wall surfaces are smoothly rounded where directional changes occur. It will be seen that the two flow paths through the device can readily be made of constant cross-sectional area throughout their lengths.

Flow through the equalizer is throttled at ports 20 by longitudinal movement of slide 22 in one direction or the other from its centralized position of FIG. 1, as, for instance, to or toward the position shown in FIG. 3. It will be seen that shifting the slide from center towards one end port will not restrict flow between that end port and the mid-port, since the port 20 in the sleeve assembly is wider than the corresponding port in the slide; but that shifting the slide in the other direction from center will restrict flow between that end port and the mid-port, since the inner edge of the sleeve assembly port 20, when the slide is centered, aligns with the inner edge of the corresponding slide port, so that the passage between sleeve and slide becomes narrowed as the slide moves as described.

As heretofore mentioned, the slide 22 moves longitudinally under the influence of dynamic fluid forces exerted on the curved slide surfaces 27a. The dynamic forces exerted on the slide may broadly be forces of impulse owing to fluid jetting thereagainst as in an impulse turbine, or of reaction, owing to the change of direction of fluid flow caused thereby, as in a reaction turbine, or may be a combination of both. Assuming the device to be used as a flow combiner, with the flow paths extending inwardly at the end ports 14, finally combining and leaving at the mid-port 15, according to the flow path traced hereinabove, it will be seen that the fluid flowing radially outward through ports 20 impinges against curved surfaces 27a and is turned longitudinally outward thereby, thus developing two longitudinal dynamic forces tending to move the slide in opposite directions. The direction of each such longitudinal force is evidently away from the end port through which fluid causing such dynamic force is entering. If the flow from one end port is greater than the flow from the other, the opposing dynamic forces on the slide are obviously unequal, and the slide will be moved under the prevailing differential of forces in a direction to throttle off the larger flow. The slide moves the necessary distance to establish equality of opposing forces, and consequently equality of flow.

When the device is used as a flow divider, with fluid entering at the mid-port and exiting at the end ports, the two flows travelling inwardly in the spaces 39 between body wall 35 and slide members 23 will impinge on curved slide surfaces 27a and be turned inwardly thereby. Again, opposing dynamic forces are exerted on the slide longitudinally thereof; and if the flows are unequal, these forces will be unequal, and the slide will move longitudinally to equalize these forces, and therefore equalize the two flows.

These dynamic forces exerted on the slide can be increased, and the sensitivity and accuracy of the device can be improved, by making the area of the annular passages between the end members 23 of the slide and the wall member 35 of the body relatively small, thus increasing the velocity of fluid flow in these regions, and therefore increasing the dynamic force exerted thereby on the slide. By using a smooth and gradual reenlargement of the passage area on both sides of these restricted regions, most of the pressure drop involved in this increase of fluid velocity can be recovered. If these two annular passages are of the same area, the equalizer will combine or divide flows in a ratio of one to one; if, however, these two annular passages are made of different areas, the equalizer will combine or divide flows in a corresponding unequal ratio, in which case the equalizer is properly termed a proportioner.

Attention is directed to the fact that movement of the slide to either side of center is limited to a distance less than the width of the ports 33 in the slide, as clearly appears in FIG. 3, so that cessation of flow in either direction between one end port and the mid-port will not thereby interrupt flow between the other end port and the mid-port.

If the slide is in metal-to-metal contact with adjacent non-moving parts, such as would normally tend to occur because of minute imperfections in manufacture causing some lateral unbalance in hydraulic forces, the slide may have, under some circumstances, a degree of tendency to stick or hang up in operation. A further feature of the invention is the provision of a means for preventing this sticking tendency by maintaining a film of fluid between the slide and the adjacent parts. Such a film can be maintained hydrodynamically by causing the slide to rotate. In view of the small lateral loads and large areas, only a slow rotation is required. Such rotation may be obtained, for example, by providing a few inclined vanes 44 on the slide. As here shown, such vanes 44 are provided on the outside of the two annular walls 28 of the slide. Alternatively, the struts 25 can be shaped as vanes, to cause rotation. It will be evident that fluid flow past these vanes, in either flow direction through the device, will exert dynamic forces causing the desired rotation of the slide.

The embodiment of the invention now described and illustrated is suitable for the entire range of pressures, from lowest to highest, and for all flows above very small ones. The equalizer is exceptionally compact and can have an overall size of only about 5" x 5" x 5⅜" for a 2" line size. It will further be evident that while the present illustrative embodiment employs a single stage impulse or reaction means, it is possible and within the broad scope of the invention to multiply the dynamic hydraulic forces acting on the slide by passing the fluid through a series of impulses or reaction stages.

In FIGS. 5 to 11, I have shown another embodiment of equalizer utilizing the same basic principle of that heretofore described, but in which the throttling member equalizes flows by rotational movement rather than axial movement. The equalizer in this case may be referred to as a rotating or turbine type.

With reference now to FIGS. 5 to 11, numeral 50 designates generally a body casing of annular cross-section formed at opposite ends with tubular end members 51 affording end ports 52. Body casing 50 is made in two symmetrical parts 50a, connected by an intermediate peripheral wall 53. Casing parts 50a have annular outwardly extending annular flanges 54 and adjoining cylindrical wall portions 55 forming a channel which receives interior annular end-beads 53a on wall 53, the assembly being secured by screws 56, and a circumferential channel 57 being thereby formed between wall 53 and wall portions 55, which is fluid sealed at 58. The peripheral wall 53 is annular, but eccentric with reference to cylindrical wall portions 55, so that the circumferential flow channel 57 progressively increases in cross-sectional area from one side around to the other, as clearly appears in FIG. 6. This flow channel 57 is narrowest on the left-hand side, as viewed in FIG. 6, and progressively increases in width to a maximum on the opposite side, where it joins a mid-port 58 in a tubular coupling 59 formed integrally with wall 53.

The near ends of cylindrical casing wall portions 55 are spaced apart a proper distance to accommodate fluid flow channels and a later described vaned throttling rotor, and turned inwardly therefrom are somewhat inwardly diverging wall portions 60. These wall portions 60 merge with outwardly extending and somewhat convergent wall portions 61, which, at their outer ends, are turned inwardly to join the slightly lesser diameter tubular end members 51.

Pressed tightly into tubular end members 51 is a sleeve 64 formed with an intermediate transverse wall or diaphragm 65, and, on each side of diaphragm 65, with a plurality of circumferentially spaced rectangular ports 66.

A throttling rotor, generally designated by numeral 68, comprises a disc 69 accommodated in the space between casing wall portions 60 and 61, and a pair of axial sleeves 70 projecting oppositely therefrom and rotatably fitted on the sleeve 64. As here shown, the rotor 68 is axially positioned on sleeve 64 between shoulders 72 formed at the inner extremities of tubular end members 51. Rotor sleeves 70 are each provided with a plurality of circumferentially spaced rectangular throttling ports 73 positioned to cooperate with ports 66 in sleeve 64. These ports 73 are wider than ports 66, for instance, approximately twice the width of ports 66, and are so positioned that in a predetermined centered position of rotor 68, one longitudinal edge of each of ports 73 aligns with a longitudinal edge of the corresponding port 64. Further, the arrangement is such that rotation in one direction of rotor 68, for example, clockwise in the aspect of FIGS. 6, 7, 9 and 10, causes throttling of the ports 66 on one side of the rotor (FIG. 9) while leaving the ports 66 on the opposite sides of the rotor wide open (FIG. 10), while rotation of the rotor in the opposite direction leaves the first-mentioned ports 66 wide open and throttles the ports 66 on the opposite side of the rotor. Rotation of the rotor in either direction from the centralized position depicted in FIGS. 5 to 7 is limited to a maximum angle corresponding to the position illustrated in FIG. 10, by means of a stop pin 75 set into the inner portion of rotor disc 68 and projecting into a groove 76 formed in the central portion of sleeve 64, as clearly shown in FIG. 11.

It will be seen that flow combining fluid flow paths are provided from the two end ports inwardly into the two halves of sleeve 64, thence radially outward through registering ports 66 and 73, thence longitudinally inward and radially outward in the space between casing wall portions 61 and 60, and disc 69, to channel 57, and finally around the latter to mid-port 59. The shaping of these flow paths may be such as to provide substantially uniform area throughout their lengths. For purpose of dividing flow, the same flow paths are followed in the reverse direction.

The rotor disc 69 is provided with a row of vanes 80 acted upon by the dynamic forces of fluid flowing outward (or inward) in the spaces between disc 80 and casing wall portions 60. It is to be understood that the vanes 80 on opposite sides of disc 69 are disposed at opposite angles, so as to produce opposing torques. Preferably, one or more rows of stationary vanes are also located on casing wall portions 60. In the present preferred embodiment, one row of vanes 80 is placed on disc 69, a row of stationary vanes 81 is placed on casing wall portions 60 just inside the row of vanes 80 and a row of vanes 82 is placed on casing wall portion 60 just outside vanes 80. These stationary and movable vanes may be of conventional design, such as known in turbines, for example, and no specific description of their contour need be given. Preferably, if more than one row of vanes is used, each row should have a different, incommensurable number of vanes—say, 29, 30 and 31 vanes for the three rows illustrated, so that the torque cannot be greatly affected by the relative angular positions of the rows. It will, of course, be evident that if all rows had the same number of vanes, the torque might have a marked maximum and minimum value as the relative positions of the rows change.

The preferred form involves the use of three rows of vanes, a middle row on the rotor disc, and an inside and an outside row on the housing wall. The outside rows then shield the middle row from fluid swirl, it being noted in this connection that the slotted sleeve members 70, when throttling flow outward from the ports 66, would tend to impart some swirl to the fluid which might upset accuracy, and also that, in the case of a flow divider, flow from the mid-port travelling about the annular passage 57 enters the vane area with considerable swirl. In the event of a simpler form using two rows of vanes, one on the disc and one on the housing, it is deemed preferable to have the outside row on the housing and the inside row on the disc, since the outside housing row would then shield the disc row from possible unsymmetric torques due to flow to or from the mid-port.

Assuming three rows of vanes, as illustrated, and assuming use of the device as a flow combiner, it will be evident that the inside vane row directs the fluid against the middle row of vanes, that the direction of fluid flow is changed by the latter, as indicated by the arrows in FIG. 6, and that the fluid from the middle row is directed against the outer row vanes, the latter shielding the middle row against unsymmetrical flow patterns, as mentioned above. Dynamic forces are thereby exerted on the middle row vanes, either forces of impulse or of reaction, or both, exerting a torque on the rotor. Also, as mentioned previously, the sets of vanes on opposite sides of the rotor disc are of opposite angles, so that opposing torques are exerted on the rotor. In the event that flows are unequal, the greater flow will cause the greater torque, and the resulting torque differential causes the rotor disc to rotate with the consequence that the rotor sleeve throttles the outflow through the ports 66 on the side tending to have the greater flow. Such adjustment proceeds until the torques are equal, and consequently until the flows are equal. A similar performance occurs when the device is used as a flow divider, with the direction of flow through the device reversed.

The equalizer as thus described has but one moving part, and requires no check valves. The device is unaffected by inertia, and, in the form of FIGS. 5 to 11, is simpler in construction and cost than the embodiment first described. The device is adapted primarily to large flows at low pressures, as in aircraft fuel systems, but is not limited in usefulness thereto.

It will be understood that the drawings and description are merely illustrative of present embodiments of the invention, and that various changes in design, structure and arrangement may be made without departing from the spirit and scope of the apppended claims.

I claim:

1. In a flow proportioner, a housing having two end ports and a mid port and two fluid passages, one between said mid port and each of said end ports, flow restricting means for said passages comprising a fixed port-defining member in each of said passages and a movable flow throttling means having port-defining members in both of said passages cooperable with said fixed port-defining members therein for throttling the flows through the passages, said movable throttling means being arranged for throttling either of said passages without affecting the flow area of the other depending upon its direction of movement, and fluid flow responsive wall elements on said movable throttling means, at least one in each of said two passages, in the paths of fluid flows in either direction through said passages and positioned and shaped to be impinged upon by said fluid flows and to alter the flow direction of said fluid flows, in such manner that said wall elements experience dynamic fluid forces of said fluid flows, said movable throttling means being arranged for movement, in response to any differential of such dynamic forces, owing to the flow rate in one passage exceeding a predetermined proportion of the whole, in a direction to throttle the flow only in the passage whose flow rate exceeds its predetermined proportion.

2. In a flow proportioner, the combination of: a body casing having a medial portion and two sides extending radially inward therefrom and then oppositely from one another to form tubular ends forming end ports, a fixed sleeve in said casing fitted around said end ports, a medial transverse barrier wall across said sleeve, a first set of radial ports through said sleeve between one of said end ports and said transverse wall, a second set of radial ports through said sleeve between the other end port and said transverse wall, a throttling sleeve rotatable on said fixed sleeve and provided with radial throttling ports cooperable with said ports in said fixed sleeve, said throttling sleeve having a given centralized position from which the latter sleeve is rotatable to restrict one set of said fixed sleeve ports relative to the other set thereof and from which the throttling sleeve is rotatable in the other direction to throttle the other set of fixed sleeve ports relative to the first-mentioned set thereof, a rotor fixed on the outside of said rotatable throttling sleeve, said medial portion of said body casing being formed to provide a circumferential fluid passage around the periphery of said rotor, a mid-port communicating with said circumferential fluid passage, said casing sides including side walls cooperating with said rotor in the definition of two annular fluid passages leading between said throttling ports and said circumferential passage, and a circular row of vanes on said rotor within each of said annular fluid passages disposed to exert opposed torques on said rotor in response to fluid flows in corresponding directions through said annular fluid passages.

3. The subject matter of claim 2, including also circular rows of vanes on said casing side walls adjacent to said rows of vanes on said rotor.

4. The subject matter of claim 3, wherein said rows of vanes on said side walls are outside the rows of vanes on said rotor.

5. The subject matter of claim 2, including also two rows of vanes on each of said casing side walls located inside and outside said rows of vanes on said rotor.

6. The subject matter of claim 2, wherein said circumferential fluid passage is of a predetermined maximum cross-sectional area at its junction with said mid-port, and progressively decreases in cross-sectional area in both directions therearound to a predetermined minimum at a point diametrically opposite said mid-port.

7. In a flow proportioner, a housing having two end ports and a mid port and two fluid passages, one between said mid port and each of said end ports, flow restricting means for said passages comprising a fixed port-defining member in each of said passages and a movable flow throttling means having port-defining members in both of said passages cooperable with said fixed port-defining members therein for throttling the flows through the passages, said movable throttling means being arranged for decreasing the flow area of either of said passages relative to the other depending upon its direction of movement, and fluid flow responsive wall elements on said movable throttling means, at least one in each of said two passages, in the paths of fluid flows in either direction through said passages and positioned and shaped to be impinged upon by said fluid flows and to alter the flow direction of said fluid flows, in such manner that said wall elements experience dynamic fluid forces of said fluid flows, said movable throttling means being arranged for movement, in response to any differential of such dynamic forces, owing to the flow rate in one passage exceeding a predetermined proportion of the whole, in a direction to decrease the flow area of the passage whose flow rate exceeds its proportion relative to the flow area of the other passage.

References Cited in the file of this patent

UNITED STATES PATENTS

| | | |
|---|---|---|
| 2,440,059 | Olcott | Apr. 20, 1948 |
| 2,844,159 | Trethewey | July 22, 1958 |
| 2,874,715 | Richards | Feb. 24, 1959 |